3,082,253
COMPLEXES OF TETRACYCLINE ANTIBIOTICS AND PREPARATION OF SAME
Elliot Bartner, New Brunswick, and Hans A. Schaeffer, Linden, N.J., assignors to Olin Mathieson Chemical Corporation, New York, N.Y., a corporation of Virginia
No Drawing. Filed June 18, 1957, Ser. No. 666,490
5 Claims. (Cl. 260—559)

This invention relates to therapeutic forms and/or formulations of antibiotics of the tetraclcline group.

The formulation of such antibiotics so that they will be acceptable by the various routes of administration presents many problems. For example, a thoroughly satisfactory intramuscularly-acceptable formulation of such antibiotics is not yet available commercially. It is necessary that such a formulation be easily administrable, give constant and uniform blood levels, and posses stability on standing; and that the formulaiton be non-toxic and free from harmful local effects.

The antibiotics of the tetracycline group, inter alia, tetracycline, chlortetracycline, oxytetracycline and bromotetracycline, are similar in many of their characteristics although ther solubilites and other physcal properties differ to some extent. It has now been found that these tetracycline group antibiotics will form complexes or addition compounds with polyphloretin phosphate which are advantageous forms of such antibiotics.

It, therefore, is an object of this invention to provide a complex of an antibiotic of the tetracycline group with polyphloretin phosphate, and methods of making these complexes.

The complexes of such antibiotics with polyphloretin phosphate are formed over a wide range of weight ratios of the respective compounds; e.g., when an aqueous solution of tetracycline hydrochloride at 50 mg./ml. and polyphloretin phosphate at 5 mg./ml. are combined, complexes precipitate almost immediately when the ratio of the solids vary from about 50:1 to about 1:50. However, the stoichiometric equivalents point occurs at a ratio of about 1 part tetracycline hydrochloride to about 1.1 parts of polyphloretin phosphate (as commercially available; purity approximately 76%).

The complexes exhibit the biological activity against microorganisms which is to be anticipated from their antibiotic content. The biological activity is determined in the usual way, and expressed in terms of the antibioitc hydrochloride as a standard.

In contrast to salts or other complexes of the tetracycline antibiotics, the complexes of this invention become more water-soluble as the pH of the aqueous solution is adjusted toward neutrality. Inasmuch as substantially neutral solutions are preferred for intramuscular injection, the tissue irritation usually encountered or intramuscular injection of the tetracycline antibiotics is substantially reduced by the use of the polyphloretin phosphate complex. The complexes may also be used in oily suspensions for parenteral use, in opthalmic solutions, in otic and nasal solutions, for elixirs and other oral solutions and suspensions, in mouth washes and for other oral purposes, in capsules and tablets, in ointments and suppositories, in burn dressings, for gauze impregnation, etc. The complexes are useful for administration to both humans and animals.

Still another use of these complexes is in providing an advantageous means of purifying an antibiotic of the tetracycline group, i.e. separating the antibiotic from genetic contaminants either at the filtered broth stage of purification or later.

The presence of the antibiotic and polyphloretin phosphate in an aqueous medium will result in the formation of the complex, which, in the form of a precipitate can be recovered by filtration. The complexes may be most conveniently formed by interacting a soluble form of the antibiotic with polyphloretin phosphate in water. The antibiotic may be used in any form which will permit reaction of the antibiotic moiety, e.g. in the form of its water-soluble salts, such as the hydrochloride, the hydrobromide, the nitrate, the sulfate, the citrate, the amine salt, the free base, or, as a sodium salt or other alkali salt, or the calcium or other alkaline earth metal salt. The complex, in the form of a precipitate, is recovered from the solution, preferably after refrigeration to complete the precipitation. The precipitate is washed and then dried to constant weight.

Although the actual mechanism of complex formation is still obscure and the physical and chemical properties may vary, depending upon the exact complex formed, the complexes are believed to be of definite chemical structure although the molar ratios do not necessarily bear a small whole number relationship. The specific characteristics of the complexes vary, depending upon the antibiotic, the molar ratio of the antibiotic to the polyphloretin phosphate, and the pH.

The complexes may be used at the pH of formation or may be adjusted during or after their formation with an alkali such as sodium hydroxide or other alkali hydroxide, or an alkaline earth hydroxide such as calcium hydroxide, or a nitrogen base such as triethylamine, triethanolamine, piperazine, morpholine, diethanolamine and choline. The formation of the complex as is frequent in complex formations, is a rather slow process and may require from a few minutes to several hours, depending upon conditions.

It has been found that the tetracycline complexes with polyphloretin phosphate are especially advantageous in that they are easily administered and free from harmful or irritating local effects, give constant and uniform blood levels, possess stability on standing, and are non-toxic.

The preparation of polyphloretin phosphate is described in the literature [cf. Example I, page 914 of Acta Chemica Scandinavica, vol. 7 (1953) pages 913–920]. The polyphloretin phosphate may be employed for the purposes of this invention in various stages of purity, since many of the impurities are eliminated in the process of complex formation and precipitation. Thus, a polyphloretin phosphate which has been successfully employed, and may be employed in the following Examples, was about 76% pure, and had the following approximate composition:

| | Percent |
|---|---|
| Polyphloretin phosphate | 77 |
| Pyridine | 7 |
| Sodium chloride | 13 |
| Water | 3 |

The following examples are illustrative, but by no means limitative, of the invention:

*Example I*

31.6 cc. of solution of tetracycline hydrochloride containing 50 mg./ml. are added with agitation to 350 cc. of polyphloretin phosphate solution at 5 mg./ml. The mixture is refrigerated for several hours and the supernatant separated from the precipitate by centrifuging. The precipitate is washed with water until free from chloride. The residue is collected and dried to constant weight. The resulting complex has the following composition:

| | Percent |
|---|---|
| Carbon | 56.38 |
| Hydrogen | 5.14 |
| Nitrogen | 3.5 |
| Phosphorus | 5.87 |
| Ash | 3.16 |

This material assays 495 units/mg. tetracycline activity.

*Example II*

400 cc. of a solution of tetracycline hydrochloride containing 50 mg./ml. are added with vigorous agitation to 2000 cc. of a solution of polyphloretin phosphate containing 10 mg./ml. The reaction mixture is refrigerated for several hours for complete precipitation and the precipitate removed by vacuum filtration, washed by slurrying until free from chloride. The solid is then dried in vacuo to constant weight.

This material assays 518 units/mg. tetracycline activity.

*Example III*

200 cc. of a solution containing 20.0 gms. of tetracycline hydrochloride and 1500 cc. of an aqueous solution containing 21.0 gms. polyphloretin phosphate are combined with vigorous agitation. The reaction mixture is refrigerated and the precipitate removed by vacuum filtration, washed and dried.

*Example IV*

200 cc. of a solution containing 20.0 gms. of tetracycline hydrochloride and 1500 cc. of an aqueous solution containing 22.0 gms. of polyphloretin phosphate are combined with vigorous agitation. The reaction mixture is refrigerated to allow for complete precipitation and the precipitate removed by vacuum filtration, washed free of chloride and dried in vacuo. The resulting complex has a potency of 531 units/mg. tetracycline activity.

*Example V*

200 cc. of a solution containing 20.0 gms. of tetracycline hydrochloride are added to 1500 cc. of aqueous solution containing 22.0 gms. polyphloretin phosphate, in which the pH has been previously adjusted to 1–1.5 with phosphoric acid. The reaction mixture is refrigerated to allow for complete precipitation and the precipitate removed by vacuum filtration, washed free of chloride. The solid is dried in vacuo to constant weight.

*Example VI*

200 cc. of a solution containing 20.0 gms. of tetracycline hydrochloride are added to 1600 cc. of an aqueous solution containing 22.4 gms. polyphloretin phosphate in which the pH has been previously adjusted to 0.5–1.5 with phosphoric acid. The reaction mixture is refrigerated to allow for complete precipitation and the precipitate removed by vacuum filtration, slurried until free from chloride and the solid dried in vacuo.

*Example VII*

10 gms. of a solution containing 500 mgs. of oxytetracycline hydrochloride are added with vigorous agitation to 100 cc. of a solution containing 800 mg. of polyphloretin phosphate. The reaction mixture is refrigerated to allow for complete precipitation. The precipitate is removed by vacuum filtration and washed until free from chloride ions. The solid is dried in vacuo.

*Example VIII*

10 cc. of a solution containing 250 mg. of chlortetracycline hydrochloride are added with vigorous agitation to 37.5 cc. of a solution containing 300 mg. of polyphloretin phosphate. The reaction mixture is refrigerated to allow for complete precipitation. The precipitate is removed by vacuum filtration and washed free from chloride.

The complex obtained in each of the foregoing examples can be employed as such (e.g. in capsules), or dissolved in aqueous alkali to provide a substantially neutral solution suitable for oral or parenteral administration. Where the antibiotic employed is impure, purification is effected in the separation of the precipitated antibiotic-polyphloretin phosphate complex; and the antibiotic can be recovered from the complex by differential solvent extraction.

The invention may be variously otherwise embodied within the scope of the appended claims.

What is claimed is:

1. A complex of an antibiotic selected from the group consisting of tetracycline, oxytetracyline, chlortetracycline and bromotetracycline with polyphloretin phosphate in the ratio of the antibiotic to the polyphloretin phosphate between about 50:1 and about 1:50.
2. The complex chlortetracycline-polyphloretin phosphate.
3. The complex oxytetracycline-polyphloretin phosphate.
4. The complex tetracycline-polyphloretin phosphate.
5. A process of preparing a complex of an antibiotic selected from the group consisting of tetracycline, oxytetracycline, chlortetracycline and bromotetracycline with polyphloretin phosphate which essentially comprises the steps of mixing the antibiotic and the polyphloretin phosphate together in aqueous solution in the ratio between about 50:1 and about 1:50 and recovering the complex from the solution as a precipitate.

References Cited in the file of this patent

UNITED STATES PATENTS

| | | |
|---|---|---|
| 2,791,609 | Kaplan | May 7, 1957 |
| 2,795,528 | Buckwalter et al. | June 11, 1957 |

FOREIGN PATENTS

| | | |
|---|---|---|
| 505,856 | Belgium | Oct. 15, 1951 |

OTHER REFERENCES

Fischer et al.: Chem. Abst., vol. 48, page 279 (1954), citing Acta Endocrinol. 13, pages 293–305 (1953).

Kaplan et al.: Antibiotic Med. and Clin. Therap. 4, pages 99–103 (February 1957).